(Model.)
C. W. WAILEY.
WEIGHING SCALE.
No. 281,586. Patented July 17, 1883.
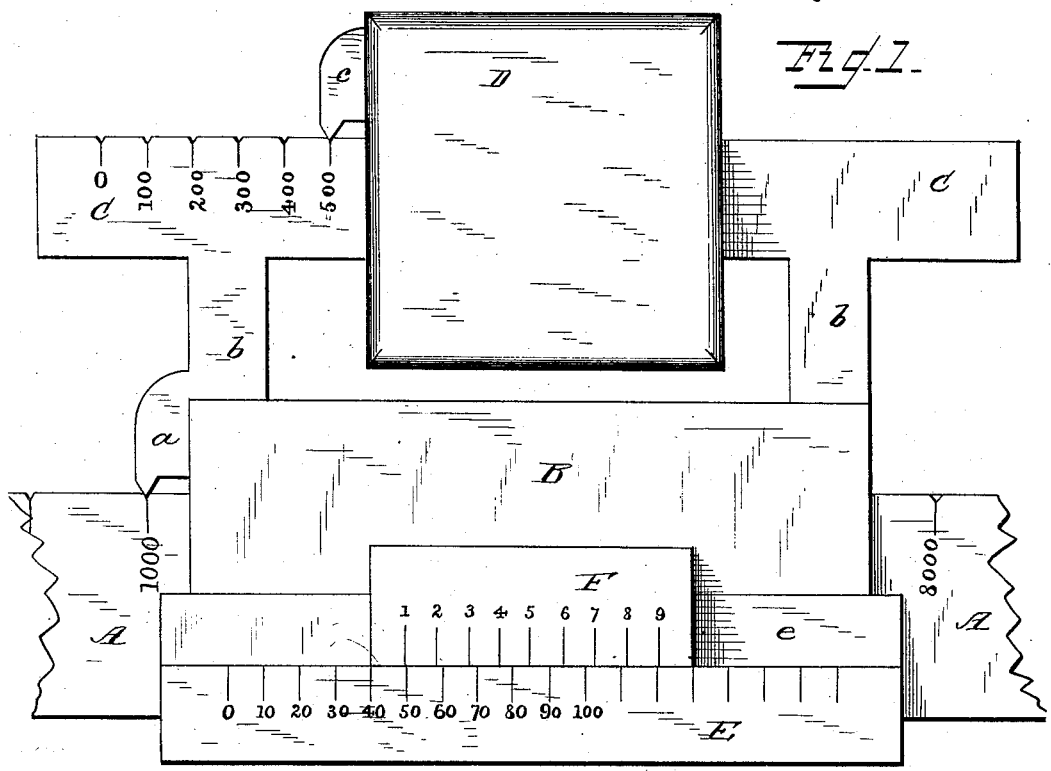
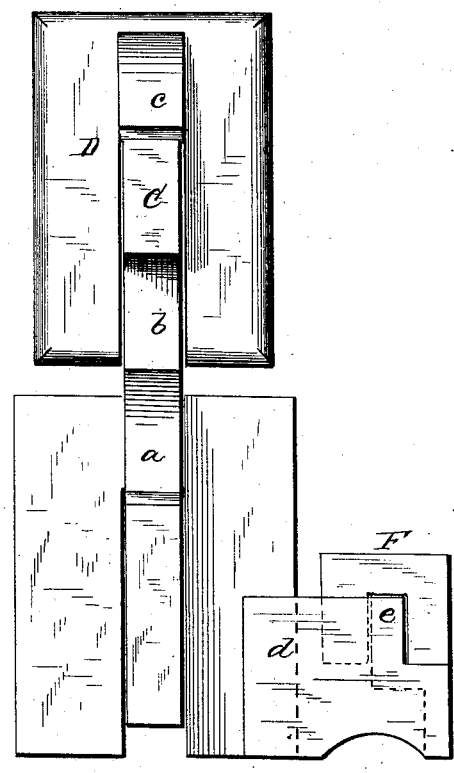
WITNESSES
F. L. Ourand
N. E. Oliphant
INVENTOR
Charles W. Wailey.
per Chas. H. Fowler
Attorney

UNITED STATES PATENT OFFICE.

CHARLES W. WAILEY, OF LEXINGTON, KENTUCKY, ASSIGNOR OF ONE-HALF TO CHARLES W. FOUSHEE, OF SAME PLACE.

WEIGHING-SCALE.

SPECIFICATION forming part of Letters Patent No. 281,586, dated July 17, 1883.

Application filed April 24, 1883. (Model.)

*To all whom it may concern:*

Be it known that I, CHARLES W. WAILEY, a citizen of the United States, residing at Lexington, in the county of Fayette and State of Kentucky, have invented certain new and useful Improvements in Weighing-Scales; and I do hereby declare that the following is a full, clear, and exact description of the same, reference being had to the annexed drawings, making a part of this specification, and to the letters and figures of reference marked thereon.

Figure 1 of the drawings is a side elevation of my invention, and Fig. 2 an end view of the same.

This invention relates to certain new and useful improvements in weighing-scales, the object thereof being to dispense with the weights usually employed at the end of the beam, and at the same time render the operation of weighing quick, simple, and accurate, without the necessity of a multiplicity of notches on said beam.

The invention therefore consists in the combination and arrangement of three distinct and separate poises in relation to each other to indicate units, tens, hundreds, and thousands when used upon a scale-beam. Said combination and arrangement of the three poises I denominate a "compound poise."

By referring to the accompanying drawings, A represents a sectional portion of a scale-beam having its upper edge graduated into one-thousand-pound divisions, or other denomination of divisions, as the use of the scale may require. Upon the scale-beam slides the main poise B, provided with a denominating-pointer, *a*, said poise being formed with upright standards *b*, which support a short beam, C, parallel to the scale-beam A, said short beam being graduated into one-hundred-pound divisions, from naught to one thousand, inclusive, and adapted to carry a sliding auxiliary poise, D, provided with a denominating-pointer, *c*. Extending outwardly from the sides of the lower portion of the main poise B are braces *d*, supporting a bar, E, said bar being graduated into ten-pound divisions, from naught to one hundred, inclusive. This bar E is formed with a guide, *e*, which supports a sliding vernier poise, F, divided into ten spaces, said ten spaces on the vernier poise covering nine divisions on the bar E. Therefore the difference in a space on the poise F and division on the bar E is one-tenth of such a division, or in this instance one pound.

In the operation of weighing, the main poise B being placed on the scale-beam A, with its pointer *a* at zero on said beam, and the auxiliary poise and vernier poises at their respective zeros upon the short beam C and bar E, the scale is properly adjusted and balanced. The main poise B, carrying the poise D and vernier poise F, is slipped along the scale-beam to the last one-thousand notch it will go without bringing down said beam, and the fractional portion of one thousand down to one, ascertained by a similar adjustment of auxiliary poise D and vernier poise F, thus readily obtaining the exact weight of an article without having to place weights of certain denominations upon a hanger at the end of the scale-beam, or dividing said beam into a multiplicity of notches, by which the weight is often inaccurately estimated on account of said notches being imperfectly arranged.

Having now fully described my invention, what I claim as new, and desire to secure by Letters Patent, is—

1. A compound poise for scale-beams, consisting of a main poise, auxiliary poise, and vernier poise, combined and arranged in relation to each other substantially as shown, and for the purpose described.

2. The main poise, constructed substantially as described, and carrying the auxiliary poise and vernier poise, and adapted to slide upon a scale-beam, substantially as and for the purpose specified.

3. The combination of a scale-beam graduated in divisions of thousands with a main poise adapted to slide thereon, and supporting a short beam graduated into divisions of hundreds, and a bar divided into spaces of tens, an auxiliary poise sliding upon said short beam, and a vernier poise suitably divided in relation to the tens-bar as to give the units, substantially as and for the purpose described.

In testimony that I claim the above I have hereunto subscribed my name in the presence of two witnesses.

CHARLES WILLIAM WAILEY.

Witnesses:
 JOHN COCHRAN,
 S. V. FRY.